(12) United States Patent
Hayashi et al.

(10) Patent No.: US 8,094,923 B2
(45) Date of Patent: Jan. 10, 2012

(54) WAFER CONTAINING CASSETTE INSPECTION DEVICE AND METHOD

(75) Inventors: Yoshinori Hayashi, Yokohama (JP); Hideki Mori, Yokohama (JP); Takeki Kogawa, Yokohama (JP)

(73) Assignee: Shibaura Mechatronics Corporation, Yokohama-shi (JP)

( * ) Notice: Subject to any disclaimer, the term of this patent is extended or adjusted under 35 U.S.C. 154(b) by 311 days.

(21) Appl. No.: 12/517,145

(22) PCT Filed: Dec. 4, 2007

(86) PCT No.: PCT/JP2007/073379
§ 371 (c)(1),
(2), (4) Date: Jun. 1, 2009

(87) PCT Pub. No.: WO2008/069191
PCT Pub. Date: Jun. 12, 2008

(65) Prior Publication Data
US 2010/0074514 A1   Mar. 25, 2010

(30) Foreign Application Priority Data
Dec. 7, 2006   (JP) .................................. 2006-331235

(51) Int. Cl.
*G06K 9/00* (2006.01)
(52) U.S. Cl. ...................................................... 382/145
(58) Field of Classification Search .................. None
See application file for complete search history.

(56) References Cited

U.S. PATENT DOCUMENTS 7,015,492 B2 * 3/2006 Garssen et al. ............. 250/559.4
2002/0130785 A1 * 9/2002 Weiss ............................ 340/673

FOREIGN PATENT DOCUMENTS

| JP | 2000-283930 | | 10/2000 |
| JP | 2004-266221 | A1 | 9/2004 |
| JP | 2005-172559 | A1 | 6/2005 |

OTHER PUBLICATIONS

International Search Report for International Application No. PCT/JP2007/073379 dated Jan. 18, 2008.

* cited by examiner

*Primary Examiner* — Tu Nguyen
(74) *Attorney, Agent, or Firm* — Kratz, Quintos & Hanson, LLP

(57) ABSTRACT

A wafer containing cassette inspection device that expresses external view attributes such as shapes of respective inspection object portions of wafer containing cassettes of different types under the same condition without changing imaging conditions for each of the types. A wafer containing cassette inspection device includes an imaging device and a processing unit which processes an image signal from the imaging device. The processing unit includes: reference image generation means; image-to-be-inspected information generation means which generates image-to-be-inspected information; image correction means which performs a process for obtaining a predetermined image from the reference image information on the image-to-be inspected information; and means which generates external view attribute information expressing external view attributes of the inspection object portions according to the corrected image information.

13 Claims, 20 Drawing Sheets

[FIG.1]
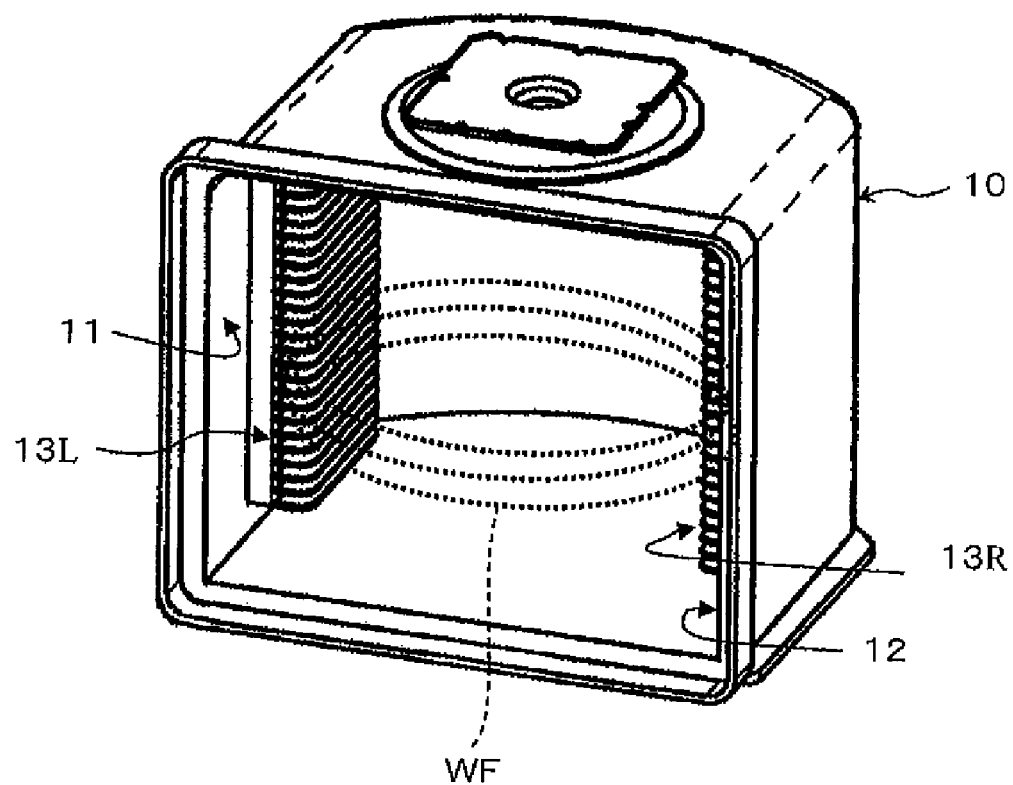

[FIG.2]
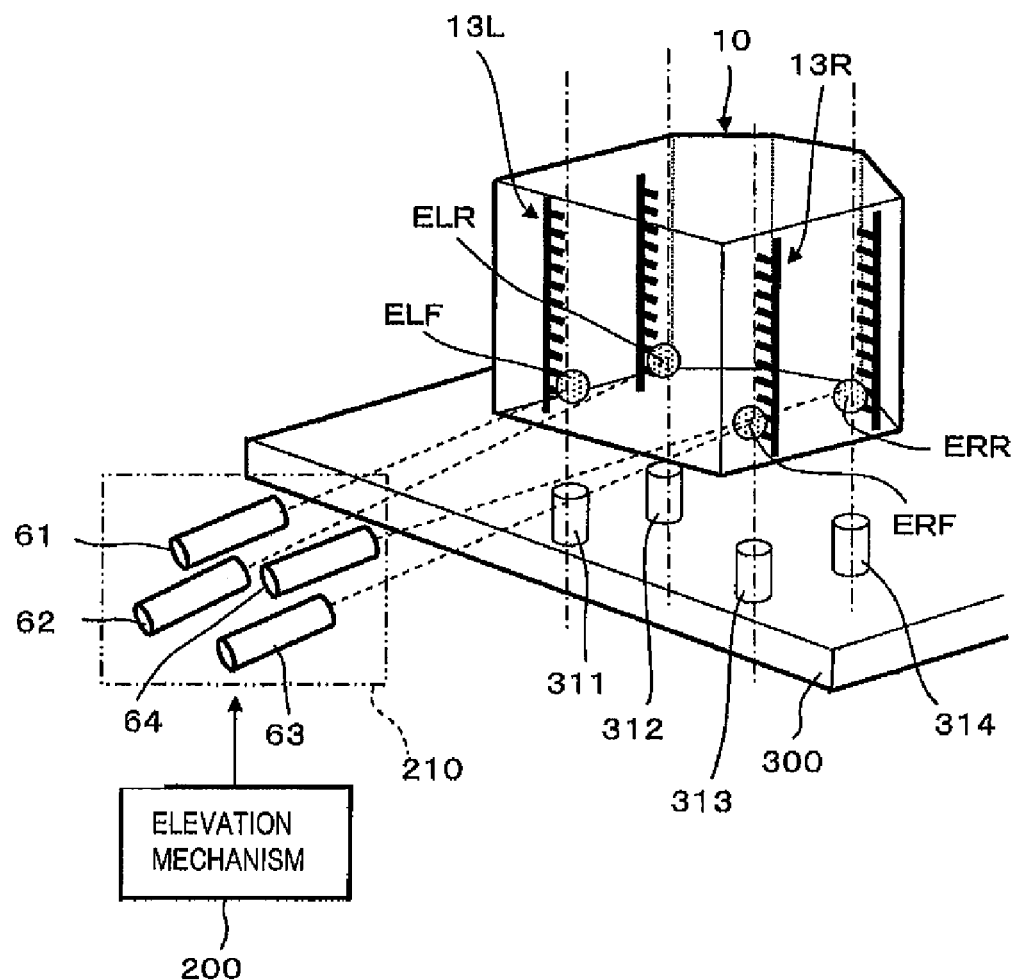

[FIG.3]
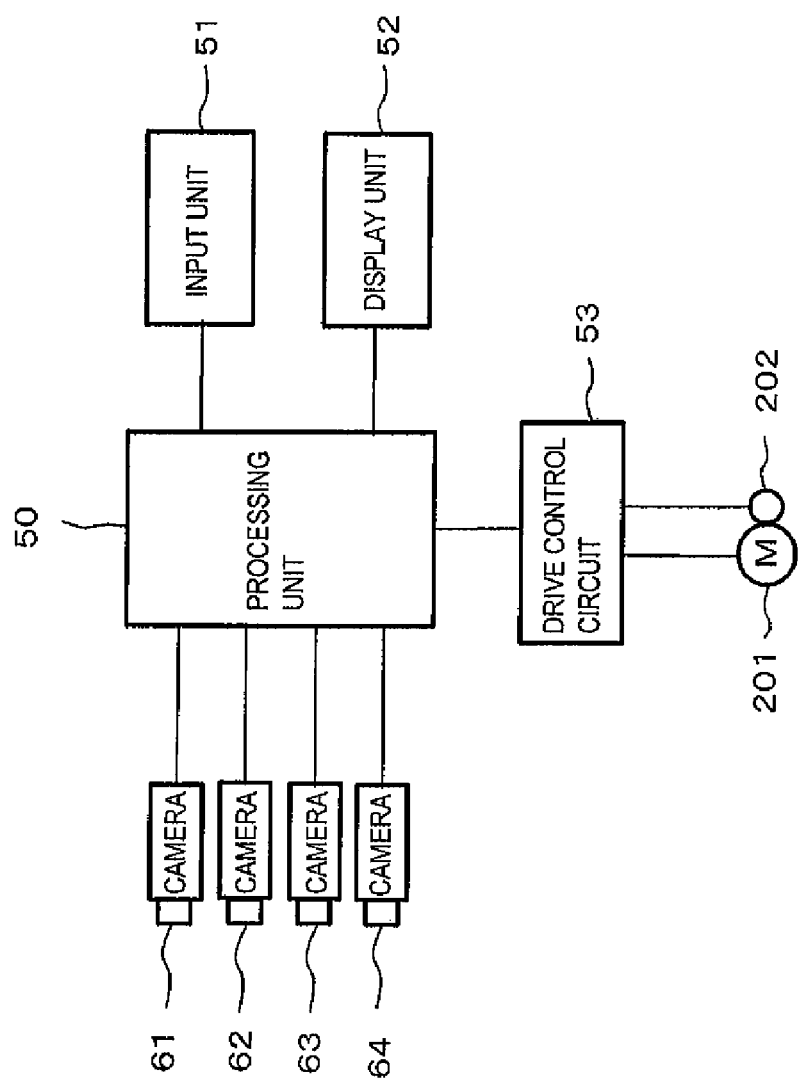

[FIG.4]
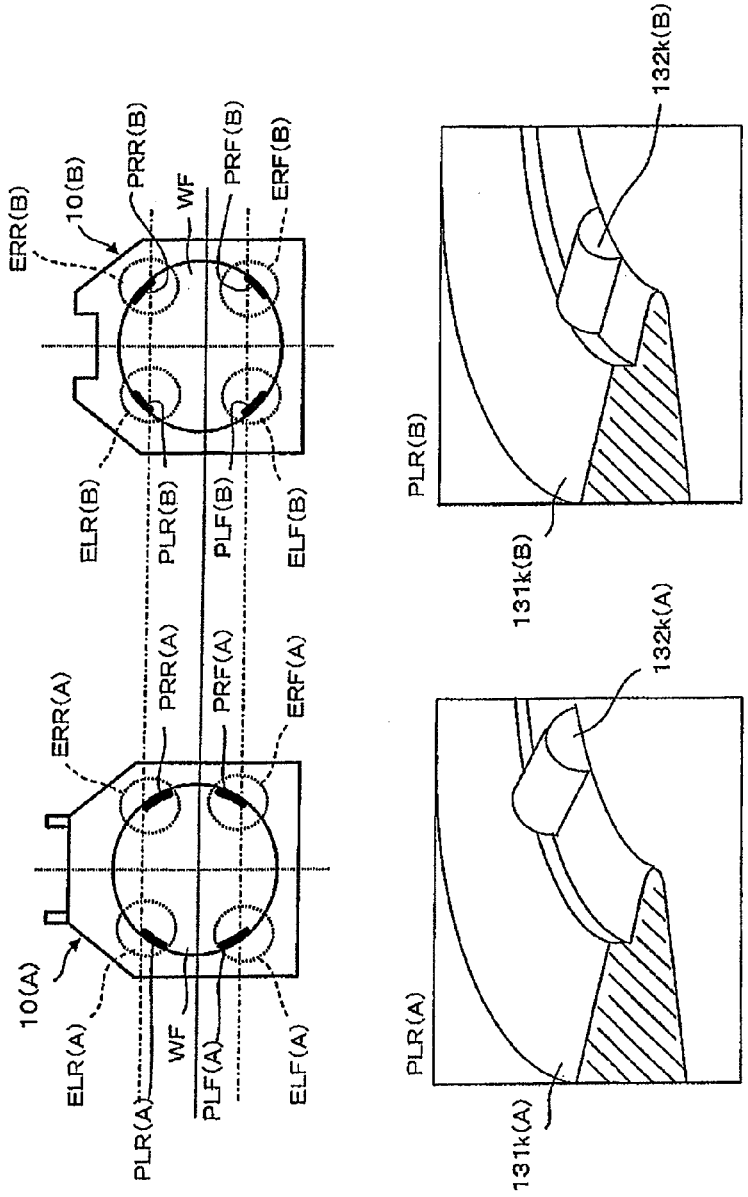

[FIG.5A]
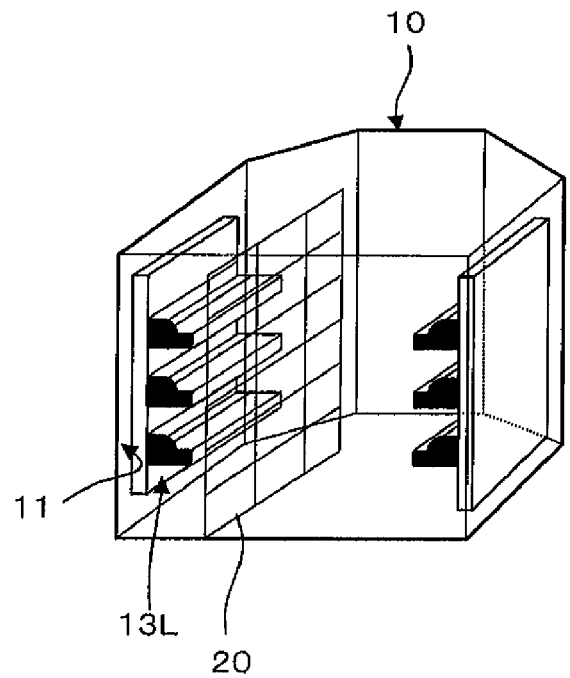
[FIG.5B]
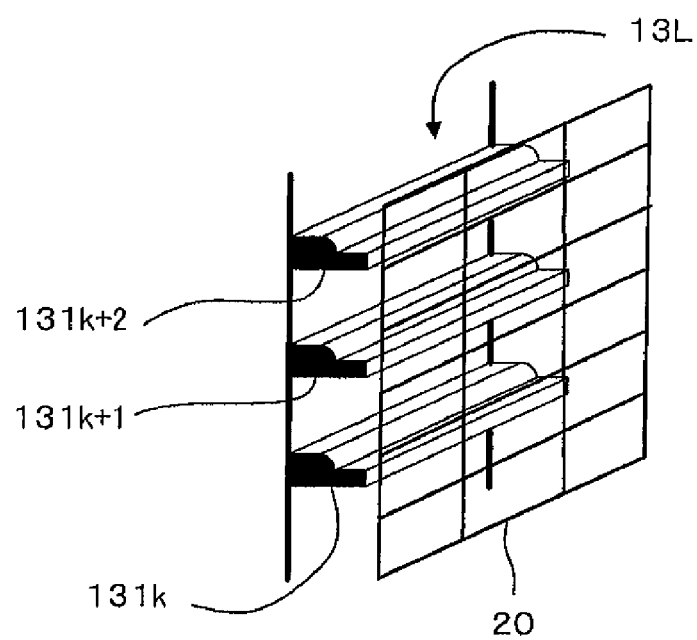

[FIG.5C]
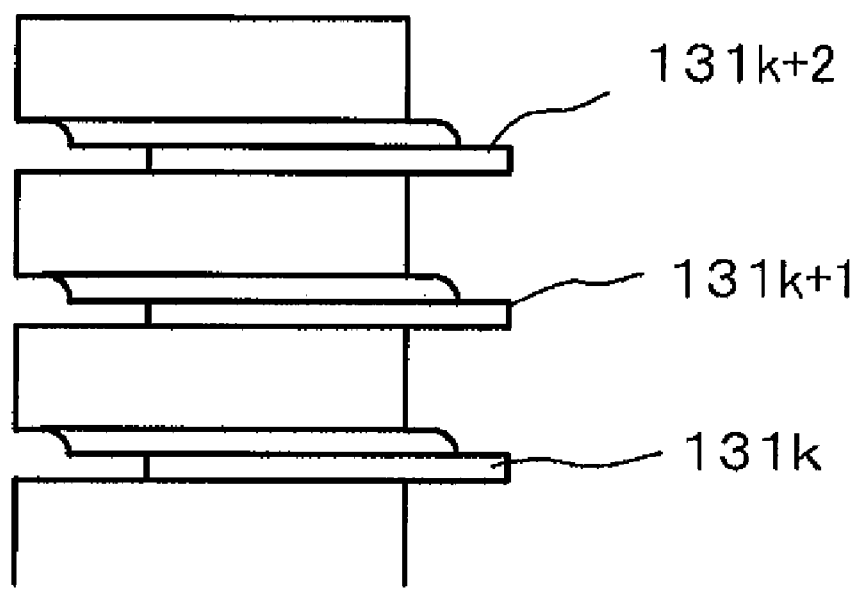

[FIG.6]
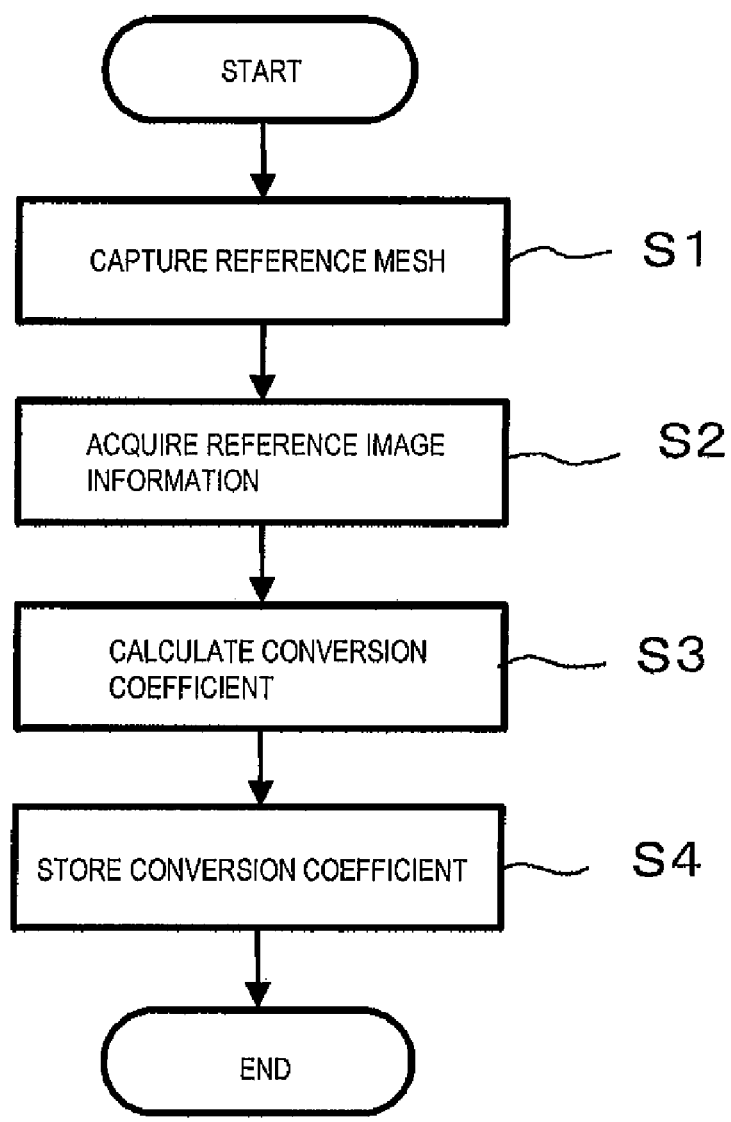

[FIG.7]
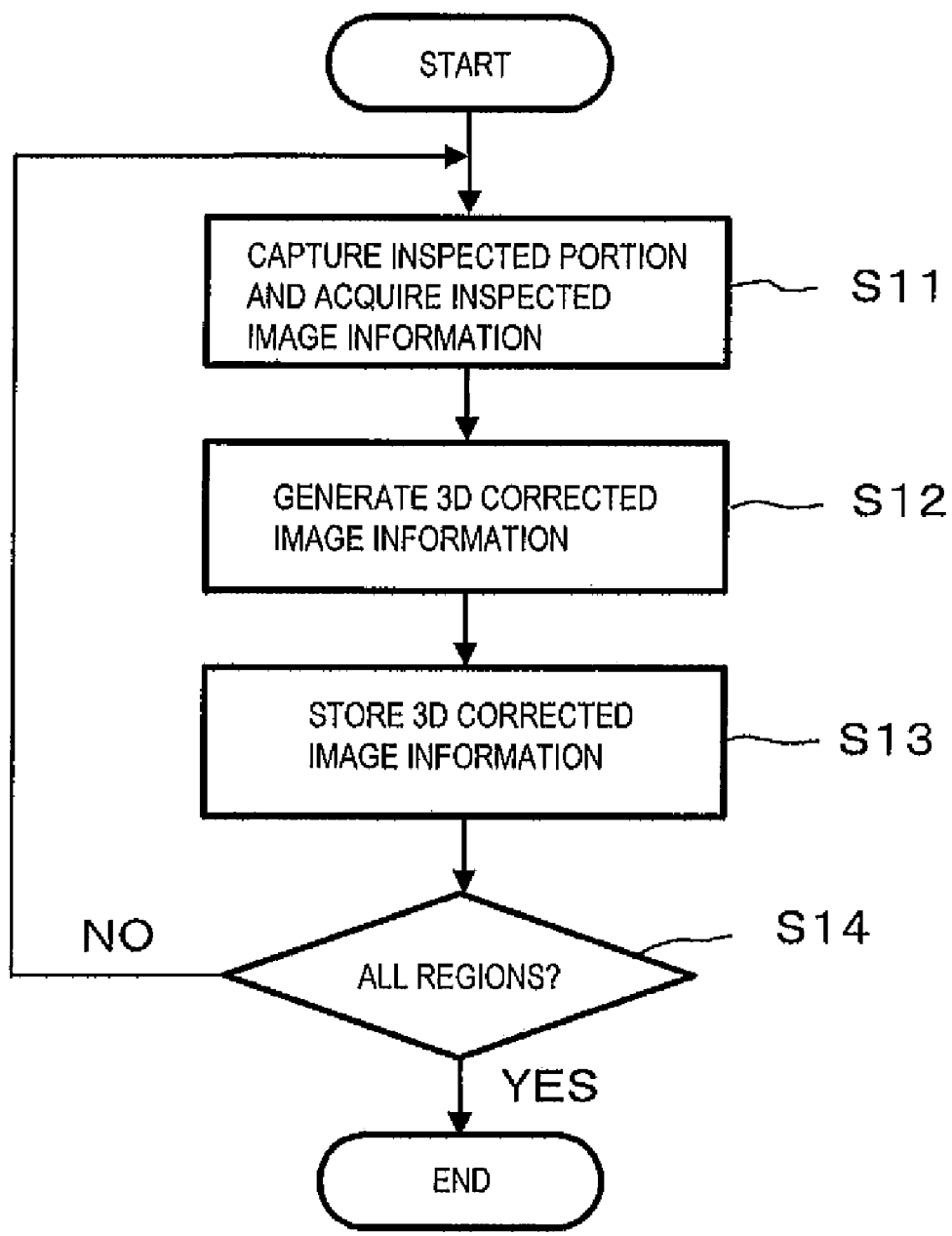

[FIG.8A]
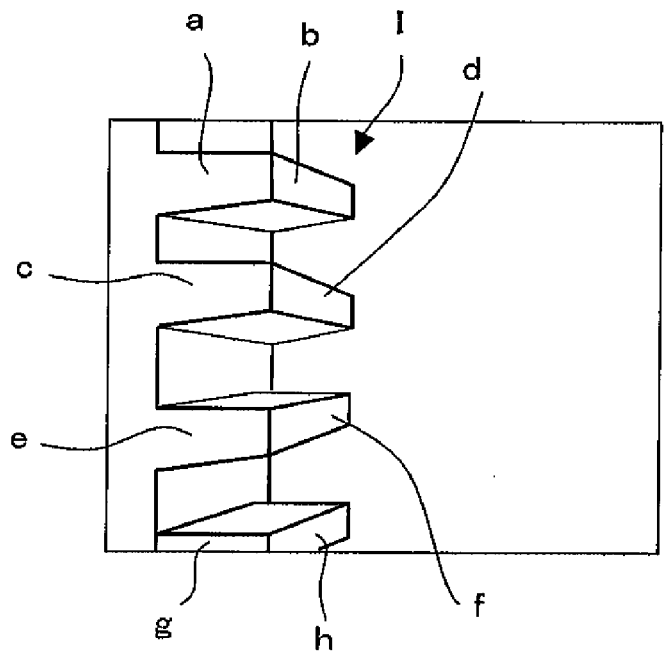
[FIG.8B]
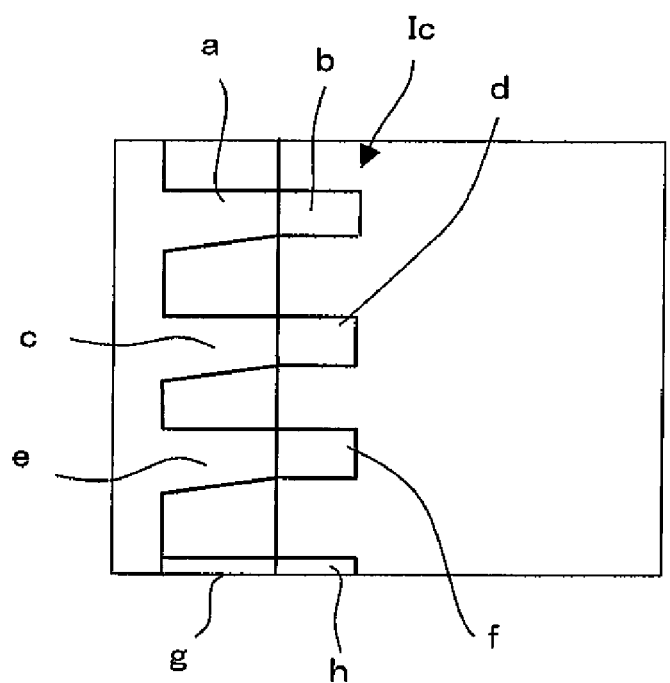

[FIG.9A]
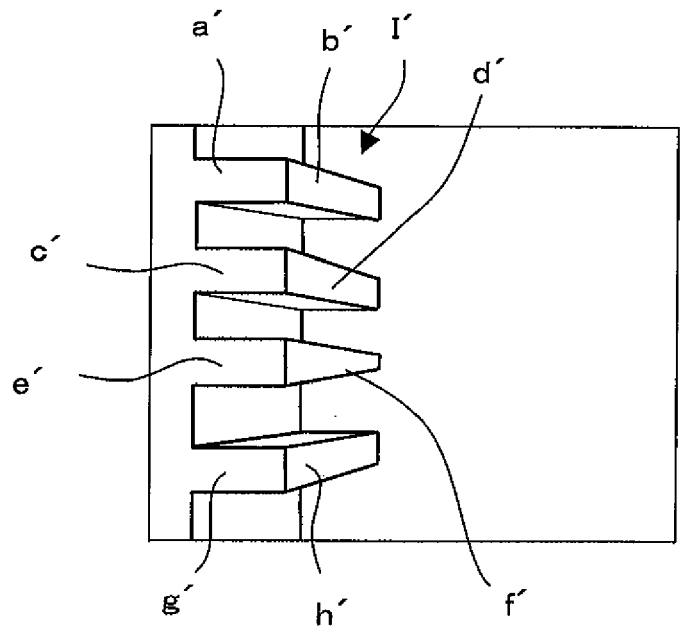
[FIG.9B]
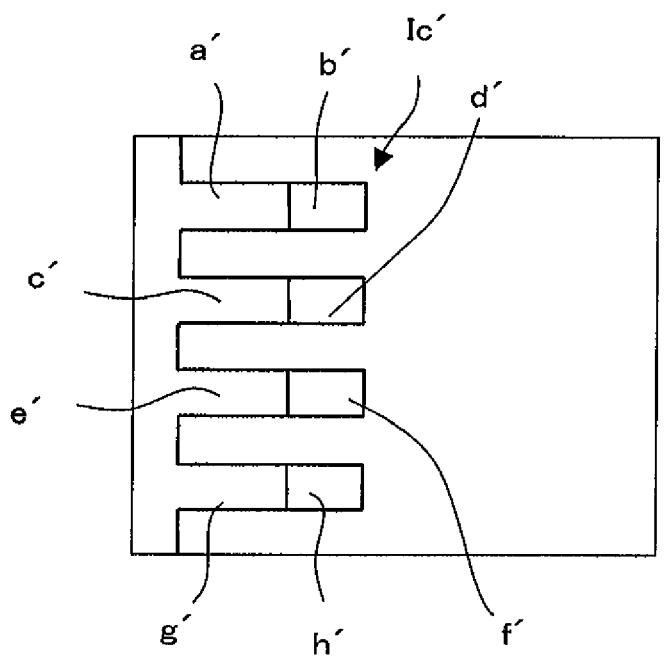

[FIG.10]
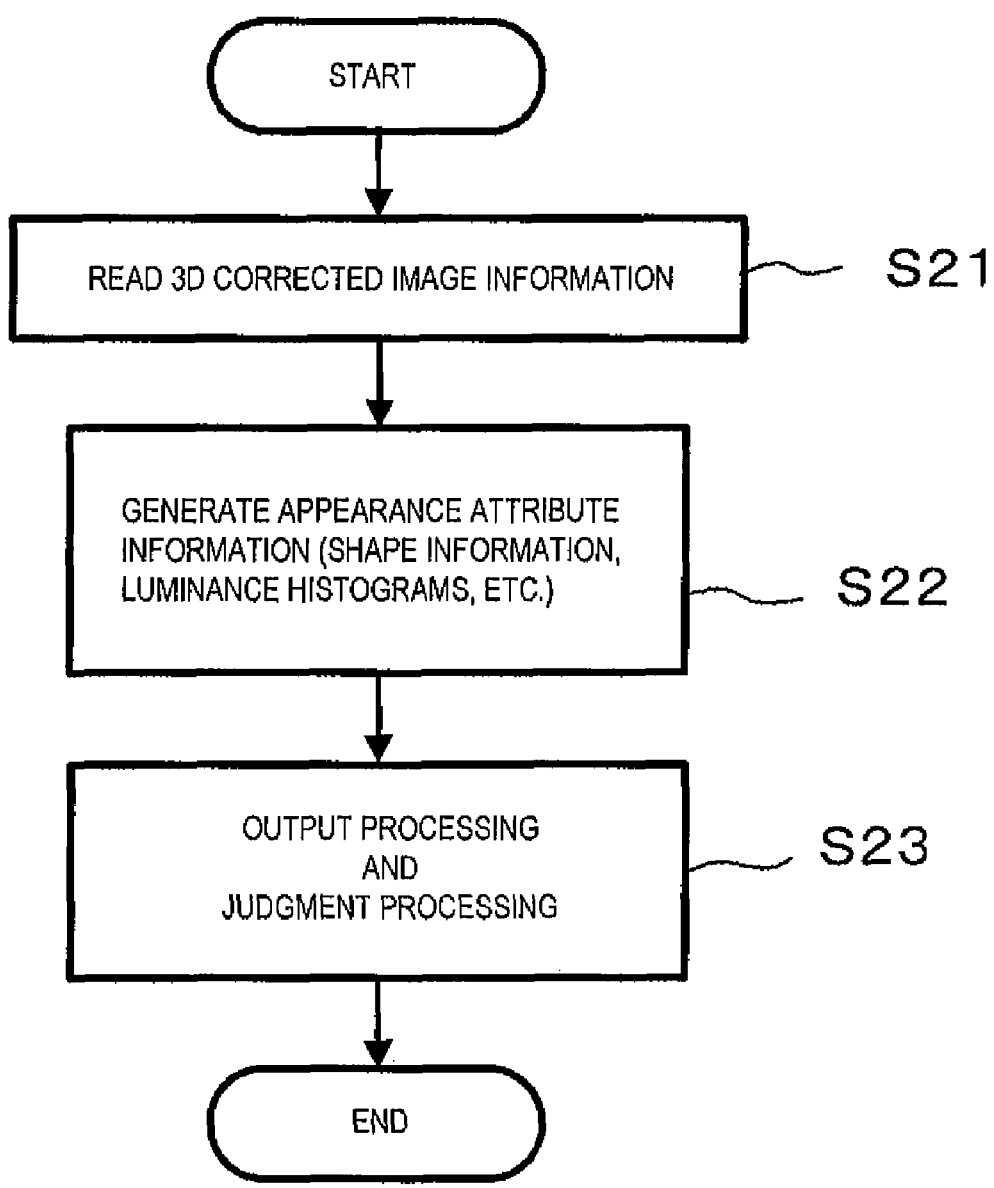

[FIG.11A]
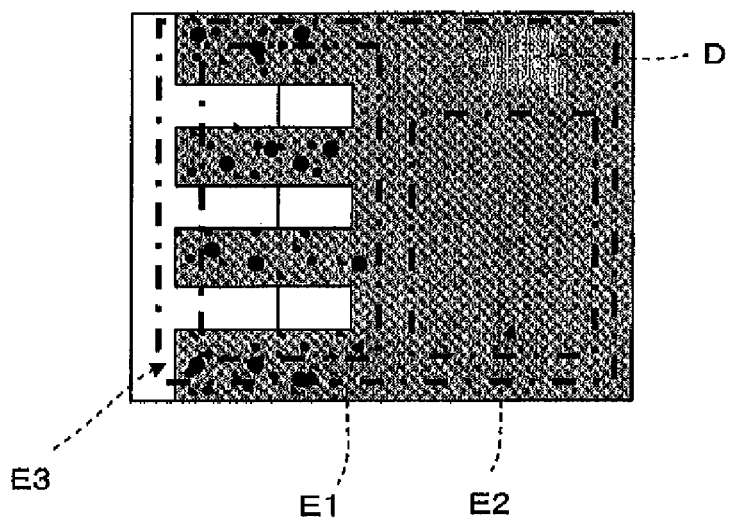
[FIG.11B]
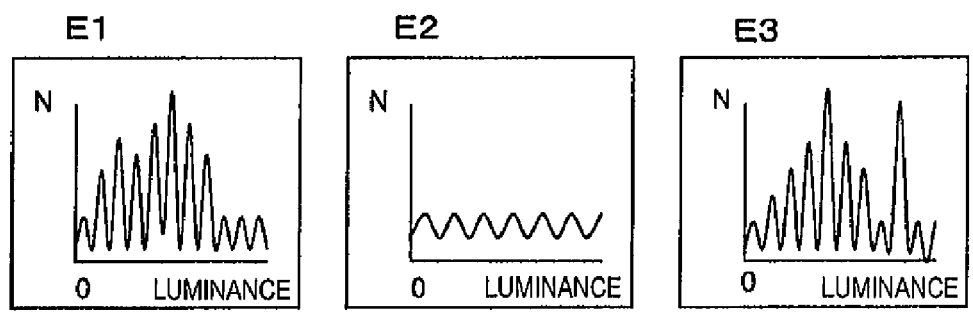

[FIG.12A]
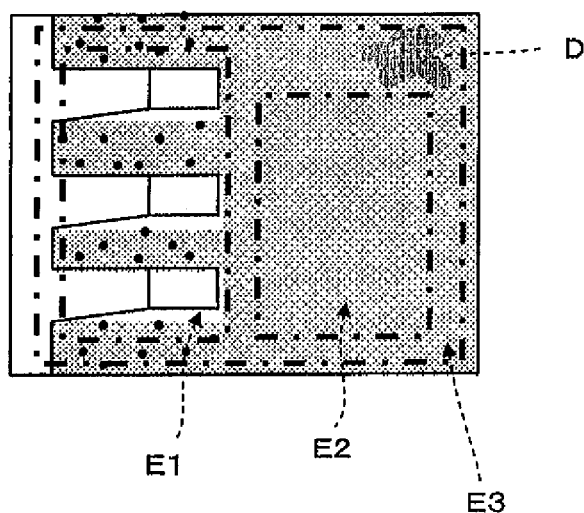
[FIG.12B]
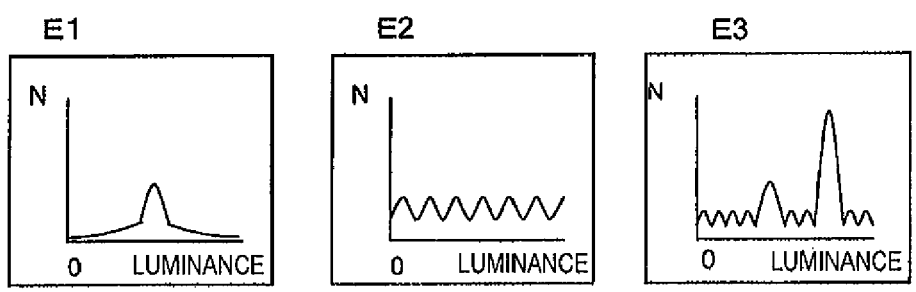

[FIG.13A]
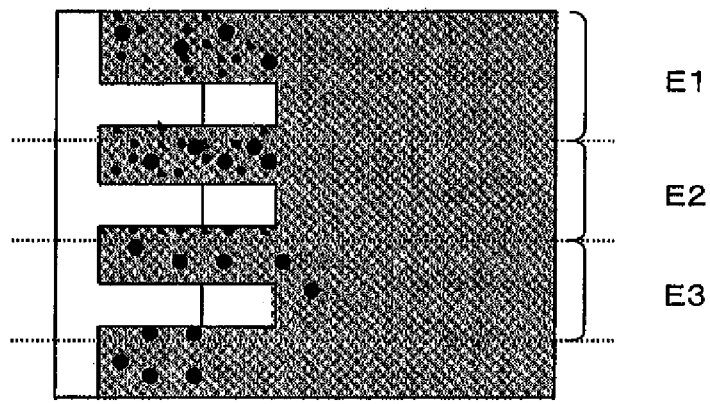
[FIG.13B]
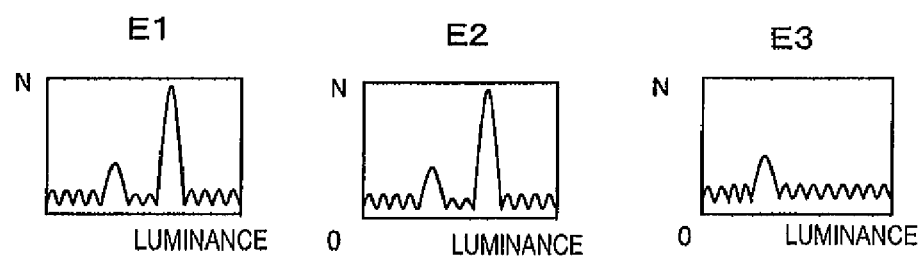
[FIG.13C]
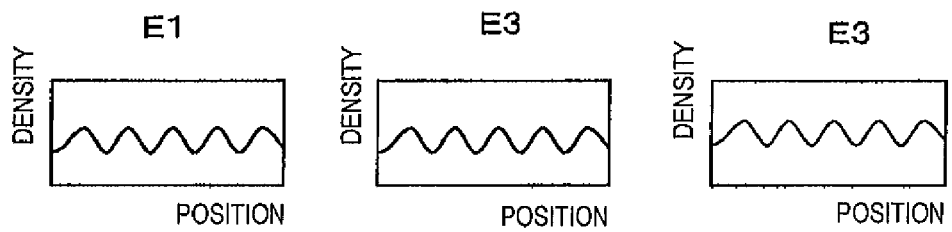

[FIG.14A]
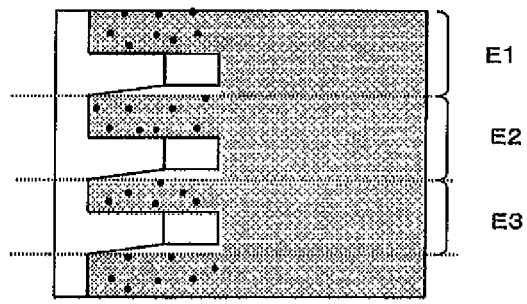
[FIG.14B]
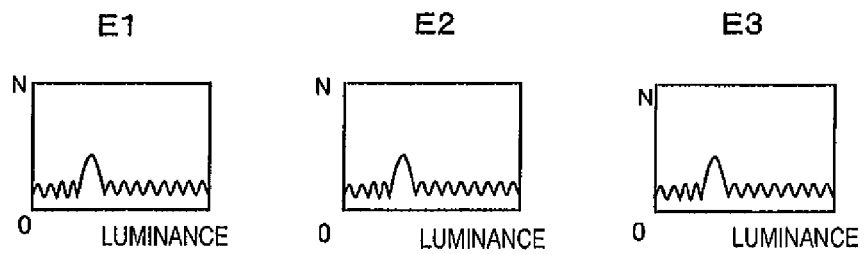
[FIG.14C]
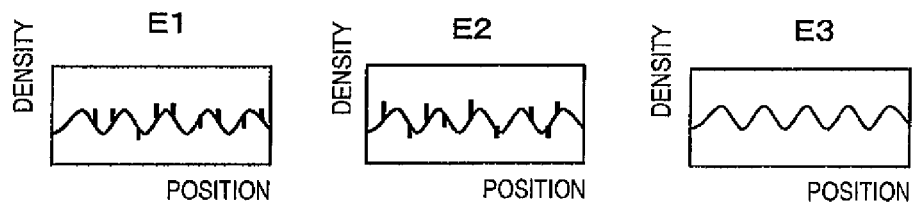

[FIG.15A]
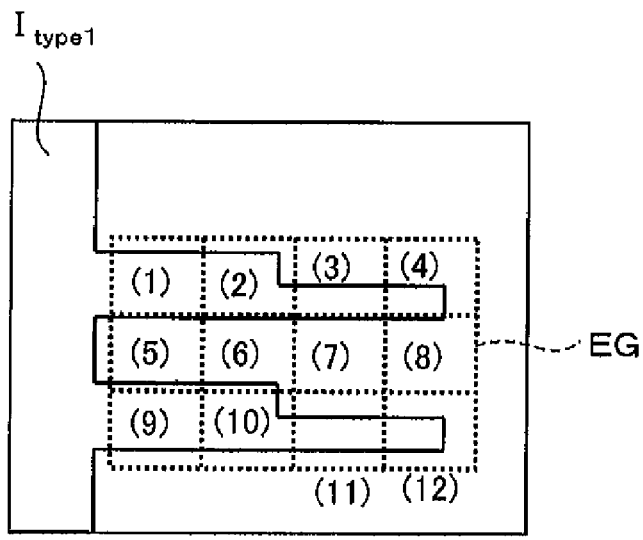
[FIG.15B]
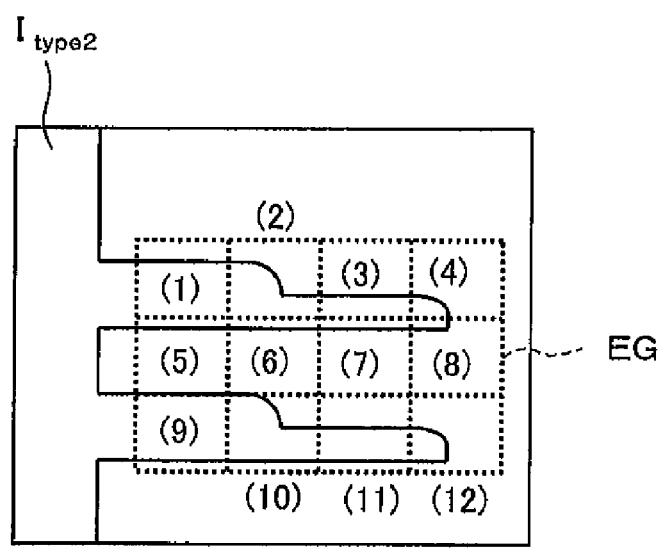

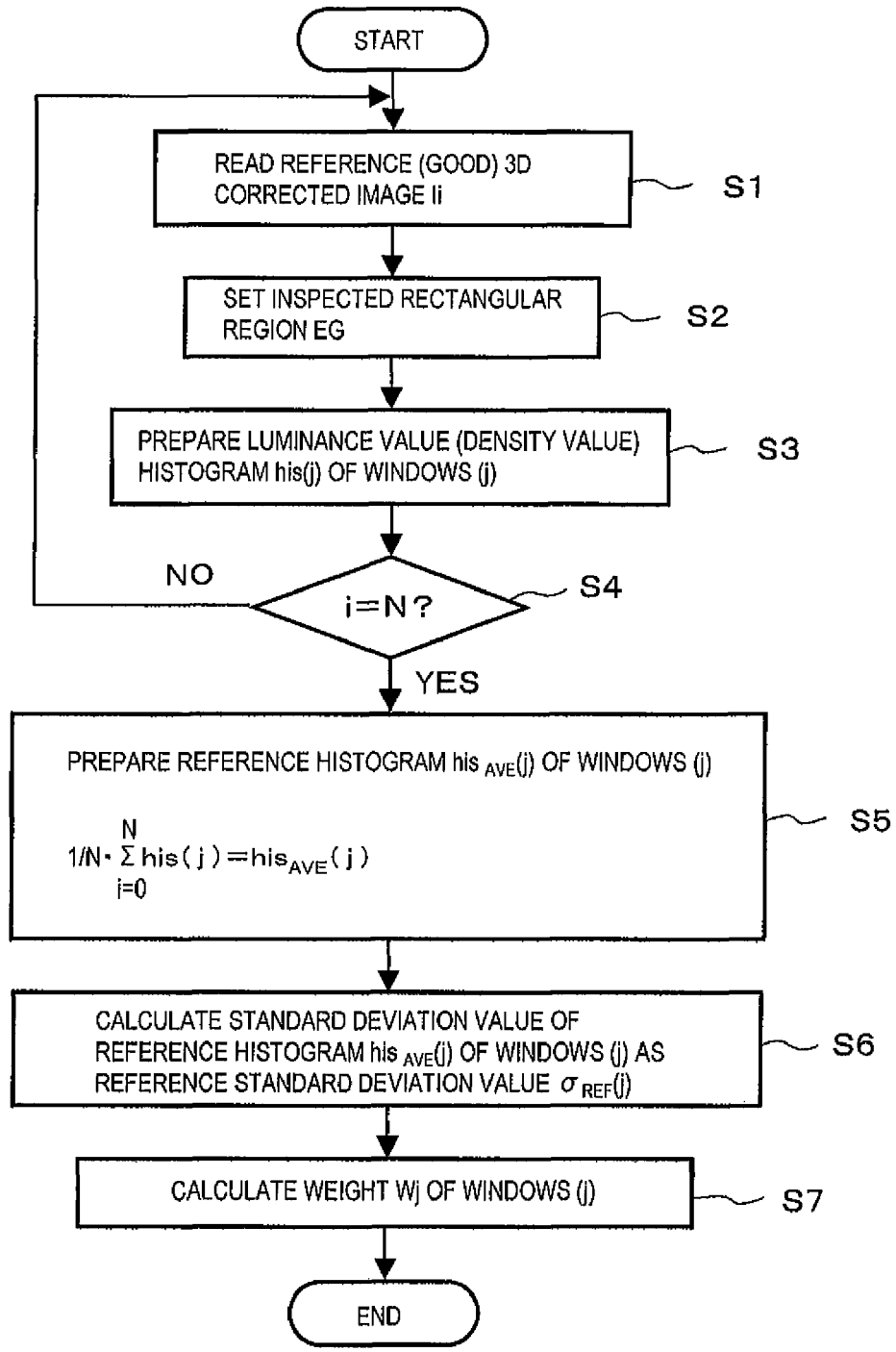

[FIG.17]
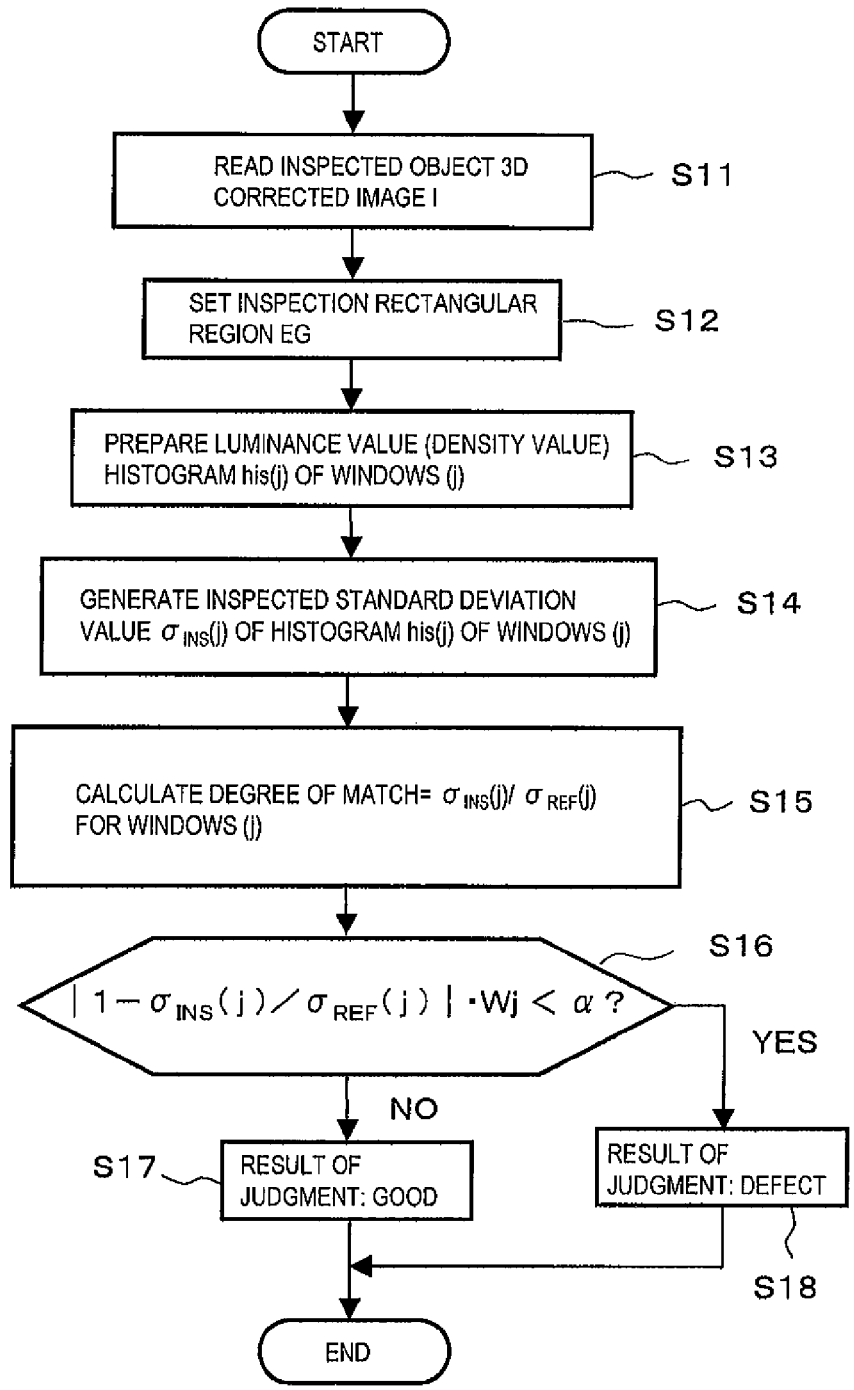

[FIG.18]
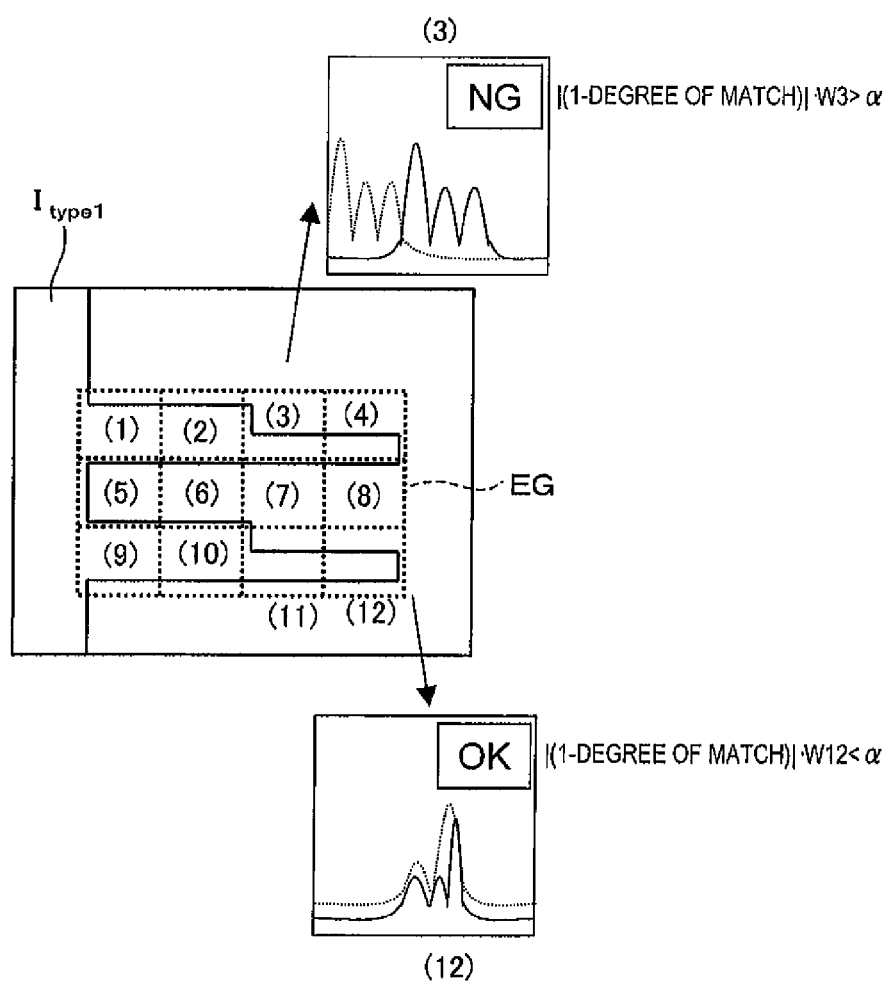

[FIG.19]
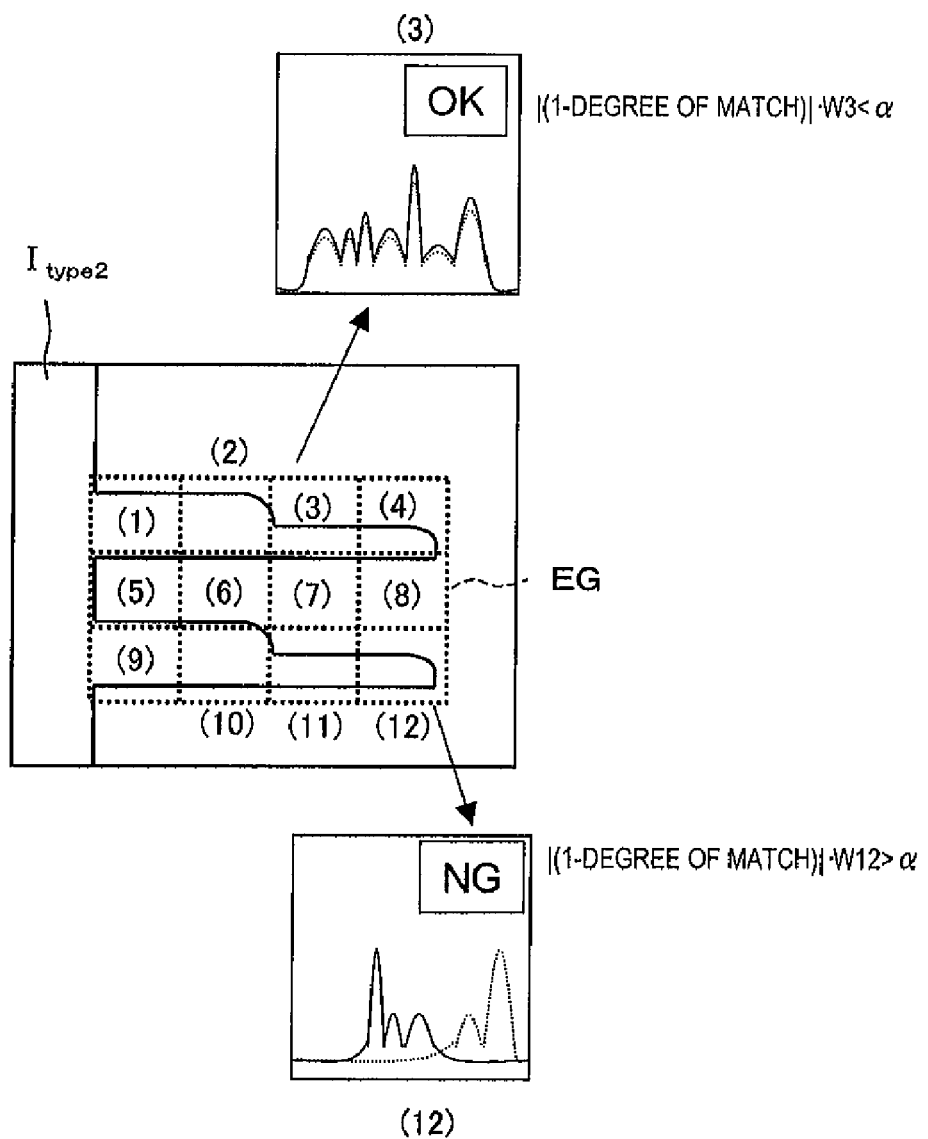

WAFER CONTAINING CASSETTE INSPECTION DEVICE AND METHOD

TECHNICAL FIELD

The present invention relates to a wafer cassette inspection system and method for inspecting the internal appearance of a wafer cassette for holding semiconductor wafers in an aligned state.

BACKGROUND ART

In the past, an inspection system for a wafer cassette used in the process of production or process of conveyance of semiconductor wafers (hereinafter referred to simply as "wafers") has been proposed (see Patent Document 1). In this conventional wafer cassette inspection system, a camera set facing the front open surface of the wafer cassette is used to capture a wafer support part formed at a side wall inside that wafer cassette, and actual shape information showing the shape of that wafer support part (for example, pitch of grooves etc.) is generated from the image obtained by that capturing operation (image information). Further, the quality of the wafer cassette is judged based on that actual shape information.

Patent Document 1: Japanese Patent Publication (A) No. 2004-266221

DISCLOSURE OF THE INVENTION

Problem to be Solved by the Invention

In the above-mentioned conventional wafer cassette inspection system, information on the actual shape is generated based on the image obtained by the camera focusing on an inside inspected portion for capture from the front open surface of a deep wafer cassette. Therefore, when inspecting different types of wafer cassettes slightly different in position or shape of the inspected portion, it is necessary to focus on the inspected portion and capture an image of it by the camera for each wafer cassette.

To eliminate this trouble, it may be considered to use a camera with a relatively deep depth of focus. By doing this, the trouble of performing the focus operation every time changing the wafer cassette to be inspected is reduced, However, with different types of wafer cassette, as explained above, the position or shape of the inspected portion slightly differs and the relative positional relationship of the inspected portion to the camera sometimes differs. In such a case, the state of expression of the inspected portion on the image (size, direction, etc.) differs. For this reason, the images of the inspected portion obtained from the different types of wafer cassettes do not show the inspected portion under the same conditions. Therefore, when judging the appearance attributes (shape, state of contamination, state of breakage, state of surface roughness, etc.) from information showing images of the inspected portions obtained from the different types of wafer cassettes (for example, density information), it is not possible to make a judgment using a common reference.

The present invention was made in consideration of this situation and provides a wafer cassette inspection system and method able to inspect appearance attributes of inspected portions of different types of wafer cassettes based on obtained images using a common reference.

Means for Solving the Problems

The wafer cassette inspection system according to the present invention has an imaging device set facing a front open surface of a wafer cassette set on a table so that a field-of-view range includes an inspected portion of the inside of the wafer cassette, capturing the field-of-view range, and outputting an image signal and a processing unit processing an image signal from the imaging device, the processing unit having a reference image generating means for generating reference image information based on an image signal output by the imaging device capturing a reference member having a predetermined shape and set with a predetermined layout relationship to the inspected portion in the field-of-view range, an inspected image information generating means for generating inspected image information based on an image signal output by the imaging device capturing an inspected portion inside the wafer cassette, an image correcting means for applying processing for obtaining a predetermined planar image of the reference member from the reference image information to the inspected image information to generate corrected image information, and a means for generating appearance attribute information showing an appearance attribute of the inspected portion based on the corrected image information.

Such a configuration performs processing for obtaining a predetermined planar image of a reference member from reference image information obtained by capturing a reference member of a predetermined shape to inspected image information obtained by capturing an inspected portion of a wafer cassette so as to obtain corrected image information, so the corrected image information can express the inspected portion under the conditions by which the reference member is expressed on the predetermined planar image. Further, based on this corrected image information, appearance attribute information showing an appearance attribute of the corresponding inspected portion is obtained.

The appearance attribute is a feature of the appearance of the inspected portion and includes the shape, state of contamination, state of breakage, state of surface roughness, etc. Further, the appearance attribute information is information showing such an appearance attribute.

Further, the wafer cassette inspection system according to the present invention can be configured having a quality judging means for judging the quality of an inspected portion based on the appearance attribute information.

Due to such a configuration, it is possible to automatically judge the quality of an inspected portion of a wafer cassette by the results of that quality judgment.

Further, the wafer cassette inspection system according to the present invention may be configured so that the system further has a reference information generating means for generating appearance attribute information for an inspected portion of a predetermined wafer cassette serving as a reference as the appearance attribute reference information, and the quality judging means judges the quality of the inspected portion in the wafer cassette to be inspected based on the appearance attribute information for the inspected portion of the wafer cassette to be inspected and the appearance attribute reference information.

Due to such a configuration, in the comparison with the predetermined wafer cassette serving as the reference, it is possible to judge the quality of the inspected portion in the wafer cassette to be inspected.

Furthermore, the wafer cassette inspection system according to the present invention may be configured so that the reference member is a planar structure having a plurality of vertical lines and horizontal lines arranged perpendicularly intersecting each other in a mesh.

Due to such a configuration, it is possible to perform processing on the inspected image information for obtaining a planar image where the surface of the reference member at which a plurality of vertical lines and horizontal lines are arranged perpendicularly intersecting each other in a mesh faces the front surface from a captured image of the reference member (reference image information).

Further, the wafer cassette inspection system according to the present invention may be configured so that the appearance attribute information generating means sets a plurality of regions on a corrected image expressed by the corrected image information and generates appearance attribute information based on states of distribution of pixel values in those regions.

Due to such a configuration, it is possible to judge the appearance of an inspected portion in accordance with the state of distribution of pixel values in regions set in the corrected image.

The pixel values express the image components of the respective pixels forming the corrected images. The luminance values, density values, etc. can be used as the pixel values.

Furthermore, the wafer cassette inspection system according to the present invention may be configured so that the plurality of regions set on the corrected image are a plurality of rectangular windows obtained by dividing a rectangular region.

Due to such a configuration, it is possible to inspect the appearance of the inspected portion for each rectangular window.

Further, the wafer cassette inspection system according to the present invention may be configured so that the inspected portion is a semiconductor wafer support part formed at a side wall in the wafer cassette and having a plurality of shelf parts.

Due to such a configuration, it is possible to inspect the appearance of the shelf parts of the semiconductor wafer support part to which an edge of a semiconductor wafer to be stored contacts.

Further, the wafer cassette inspection system according to the present invention may be configured so that the reference member is a planar structure having a plurality of vertical lines and horizontal lines arranged perpendicularly intersecting each other in a mesh, and the reference image generating means generates the reference image information based on an image signal output from the imaging device when the imaging device captures the reference member where a plane in which the plurality of vertical lines and horizontal lines are arranged is set at a predetermined nearby position of a support part of the semiconductor wafer in a layout parallel to the same.

Due to such a configuration, it is possible to obtain reference image information in which the plurality of perpendicularly intersecting vertical lines and horizontal lines are the reference lines for the shelf part.

Further, the wafer cassette inspection system according to the present invention may be configured so that the appearance attribute information generating means sets a rectangular region divided into a plurality of rectangular windows on a corrected image expressed by the corrected image information and generates the appearance attribute information based on the state of distribution of pixel values in each rectangular window.

Due to such a configuration, it is possible to judge the appearance of an inspected portion in accordance with the state of distribution of pixel values contained for each rectangular window set on the corrected image.

Furthermore, the wafer cassette inspection system according to the present invention may be configured having a reference information generating means for generating appearance attribute reference information based on the state of distribution of pixel values for each rectangular window of the rectangular region set on a corrected image for a semiconductor wafer support part of a predetermined wafer cassette serving as a reference and a quality judging means for judging the quality of the inspected portion of the wafer cassette to be inspected based on the appearance attribute reference information for each rectangular window and appearance attribute information for the corresponding rectangular window generated by the appearance attribute information generating means for the wafer cassette to be inspected.

Due to such a configuration, in the comparison with the predetermined wafer cassette serving as the reference, it is possible to judge the quality of the inspected portion in the wafer cassette to be inspected in accordance with the state of distribution of the pixel values contained for each rectangular window set on a corrected image.

Further, the wafer cassette inspection system according to the present invention may be configured so that the reference information generating means generates a histogram showing the state of distribution of pixel values for each rectangular window of the rectangular region for each of the plurality of corrected images generated for a predetermined wafer cassette serving as a reference and generates appearance attribute reference information based on the plurality of histograms for the plurality of corrected images for each rectangular window.

Due to such a configuration, the appearance attribute reference information is generated from a plurality of histograms for a plurality of corrected images for each rectangular window, so it is possible to obtain appearance attribute reference information more suitable as a reference in quality judgment.

Furthermore, the wafer cassette inspection system according to the present invention is configured so that the system further has a weight generating means for generating a weighting coefficient in accordance with degrees of fluctuation of a plurality of histograms obtained for each rectangular window of the rectangular region set for the predetermined wafer cassette serving as the reference, and the quality judging means judges the quality of the inspected portion of the wafer cassette to be inspected based on the appearance attribute reference information and the appearance attribute information for each rectangular window and the weighting coefficient for the corresponding rectangular window.

Due to such a configuration, the quality judgment of the inspected portion is performed considering the degrees of fluctuation of the plurality of histograms obtained for each rectangular window of the rectangular region set for the predetermined wafer cassette serving as the reference, so even if the degree of fluctuation of the state of distribution of the pixel values for each rectangular windows differs, it is possible to perform the quality judgment of the inspected portion by a standard reference without changing the reference for each rectangular window.

The wafer cassette inspection method according to the present invention is a method using an imaging device set facing a front open surface of a wafer cassette set on a table so that a field-of-view range includes an inspected portion of the inside of the wafer cassette, capturing the field-of-view range, and outputting an image signal and having a reference image generating step generating reference image information based on an image signal output from the imaging device when the imaging device captures a reference member having a predetermined shape and set with a predetermined layout relationship to the inspected portion in the field-of-view range, an inspected image information generating step generating inspected image information based on the image signal which the imaging device outputs by capturing the inspected portion inside the wafer cassette, an image correction step applying processing for obtaining a predetermined planar image of the reference member from the reference image information to the inspected image information to generate corrected image information, and a step of generating appearance attribute information showing an appearance attribute of the inspected portion based on the corrected image information.

Effects of the Invention

According to the wafer cassette inspection system and method according to the present invention, corrected image information showing the inspected portion of the wafer cassette can always express the inspected portion under conditions by which a reference member having a predetermined shape and set with a predetermined layout relationship to the inspected portion is expressed on a predetermined planar image, so the appearance attribute information obtained based on the corrected image information expressing inspected portions at different types of wafer cassettes captured without changing the capturing conditions can also express the inspected portions under the same conditions. Therefore, by using that appearance attribute information, it is possible to judge, that is, inspect, the appearance attributes of the inspected portions of different types of wafer cassettes by a common reference.

BRIEF DESCRIPTION OF THE DRAWINGS

[FIG. 1] A perspective view showing a wafer cassette to be inspected by a wafer cassette inspection system according to an embodiment of the present invention.

[FIG. 2] A view showing the basic configuration of a mechanism of a wafer cassette inspection system according to an embodiment of the present invention.

[FIG. 3] A block diagram showing the basic configuration of a control system of a wafer cassette inspection system according to an embodiment of the present invention.

[FIG. 4] A view showing the portions supporting a wafer in different types of wafer cassettes.

[FIG. 5A] A view showing the principle of image processing along with FIG. 5B and FIG. 5C.

[FIG. 5B] A view showing the principle of image processing along with FIG. 5A and FIG. 5C.

[FIG. 5C] A view showing the principle of image processing along with FIG. 5A and FIG. 5B.

[FIG. 6] A flow chart showing the processing routine of a processing unit in a control system shown in FIG. 3 (part 1).

[FIG. 7] A flow chart showing the processing routine of a processing unit in a control system shown in FIG. 3 (part 2).

[FIG. 8A] A view showing an image captured for a first type of wafer cassette.

[FIG. 8B] A view showing a three-dimensional corrected image obtained by correcting the image of FIG. 8A.

[FIG. 9A] A view showing an image captured for a second type of wafer cassette.

[FIG. 9B] A view showing a three-dimensional corrected image obtained by correcting the image of FIG. 9A.

[FIG. 10] A flow chart showing the processing routine of a processing unit in a control system shown in FIG. 3 (part 3).

[FIG. 11A] A view showing a plurality of inspection areas set in a three-dimensional corrected image for a certain type of wafer cassette.

[FIG. 11B] A diagram showing an example of the parameters showing appearance attributes of the contamination etc. of the areas set in the three-dimensional corrected image as shown in FIG. 11A.

[FIG. 12A] A view showing a plurality of inspection areas set in a three-dimensional corrected image for another type of wafer cassette.

[FIG. 12B] A diagram showing an example of the parameters showing appearance attributes of the contamination etc. of the areas set in the three-dimensional corrected image as shown in FIG. 12A.

[FIG. 13A] A view showing another plurality of inspection areas set in a three-dimensional corrected image for a certain type of wafer cassette.

[FIG. 13B] A diagram showing an example of the parameters showing appearance attributes of the contamination etc. of the areas set in the three-dimensional corrected image as shown in FIG. 13A.

[FIG. 13C] A diagram showing another example of the parameters showing the appearance attributes of the surface roughness of the areas set in the three-dimensional corrected image as shown in FIG. 13A.

[FIG. 14A] A view showing another plurality of inspection areas set in a three-dimensional corrected image for another type of wafer cassette.

[FIG. 14B] A diagram showing an example of the parameters showing the appearance attributes of the contamination etc. of the areas set in the three-dimensional corrected image as shown in FIG. 14A.

[FIG. 14C] A diagram showing an example of the parameters showing the appearance attributes of the surface roughness of the areas set in the three-dimensional corrected image as shown in FIG. 14A.

[FIG. 15A] A view showing a rectangular inspection region set in a three-dimensional corrected image of an inspected portion in a certain type of wafer cassette.

[FIG. 15B] A view showing a rectangular inspection region set in a three-dimensional corrected image of an inspected portion in another type of wafer cassette.

[FIG. 16] A flow chart showing processing relating to generation of a reference standard deviation value $\sigma_{REF}$ (j) (appearance attribute reference information), generation of weight Wj, and setting of a threshold value used for quality judgment.

[FIG. 17] A flow chart showing quality judgment processing.

[FIG. 18] A diagram showing an example of the results of quality judgment of an inspected portion in a certain type of wafer cassette.

[FIG. 19] A diagram showing an example of the results of quality judgment of an inspected portion in another type of wafer cassette.

DESCRIPTION OF NOTATIONS 10 wafer cassette
11 left side wall
12 right side wall
13L left wafer support part
13R right wafer support part
131$k$ to 131$k$+2 shelf part
20 reference mesh
50 processing unit
51 input unit
52 display unit
53 drive control circuit
61, 62, 63, 64 cameras 200 elevation mechanism
210 camera fastening mechanism
300 table
311, 312, 313, 314 reference pins

BEST MODE FOR CARRYING OUT THE INVENTION

Below, an embodiment of the present invention will be explained using the drawings.

A wafer cassette inspected by a wafer cassette inspection system according to an embodiment of the present invention is configured as shown in FIG. 1.

In FIG. 1, this wafer cassette 10 is used for conveying wafers WF in a semiconductor production process and is comprised of a plastic box having an opened surface at its front. Inside the wafer cassette 10, one side wall (left side wall) 11 is formed with a left wafer support part 13L, while the other side wall (right side wall) 12 is formed with a right wafer support part 13R. The left wafer support part 13L and right wafer support part 13R are respectively provided with pluralities of shelf parts arranged at predetermined intervals in the vertical direction. Wafers WF are held in the wafer cassette 10 in a state with their peripheral parts supported by shelf parts of the left wafer support member 13L and shelf parts of the right wafer support member 13R positioned at the same height.

The inspection system for inspecting the wafer cassette 10 of the above structure is configured as shown in FIG. 2 and FIG. 3. FIG. 2 is a view showing the basic structure of a mechanism of the inspection system, while FIG. 3 is a block diagram showing the basic configuration of the control system.

In FIG. 2, this inspection system is provided with a table 300 for carrying the wafer cassette 10 to be inspected. Four cameras 61, 62, 63, and 64 (imaging devices) are attached to a camera fastening mechanism 210 so as to face the front open surface of the wafer cassette 10 set on that table 300. The camera 61 is adjusted in orientation etc. so that a front side support portion at the left wafer support part 13L of the wafer cassette 10 is included in a field-of-view range ELF. The camera 62 is adjusted in orientation etc. so that a back side support portion at the left wafer support part 13L of the wafer cassette 10 is included in a field-of-view range ELR. The camera 63 is adjusted in orientation etc. so that a front side support portion at the right wafer support part 13R of the wafer cassette 10 is included in a field-of-view range ERF. The camera 64 is adjusted in orientation etc. so that a back side support portion at the right wafer support part 13R of the wafer cassette 10 is included in a field-of-view range ERR. In this way, a wafer support portion with an appearance attribute which could affect the wafer housed is selected as the inspected portion.

The four cameras 61 to 64 are attached to the camera fastening mechanism 210 in the state adjusted in orientation as explained above. This camera fastening mechanism 210 is designed to be raised and lowered by an elevation mechanism 200. By the camera fastening mechanism 210 being raised and lowered, the four cameras 61 to 64 are raised and lowered without changing their relative positional relationship with the wafer cassette 10 in directions other than the vertical direction.

The table 300 on which the wafer cassette 10 is placed has four reference pins 311, 312, 313, and 314 fastened to it. The positions of the reference pins 311, 312, 313, and 314 in the plane of the table 300 are set to match the positions of the wafer support portions included in the field-of-view ranges ELF, ELR, ERF, and ERR of the cameras 61, 62, 63, and 64 in the plane of the table 300.

The control system of this inspection system is configured as shown in FIG. 3.

In FIG. 3, this control system has a processing unit 50 connected to the four cameras units 61 to 64, receiving input image signals from the cameras 61 to 64 and processing them. The processing unit 50 is connected to an input unit 51 and display unit 52, performs processing based on operating information from the input unit 51, and displays the information obtained by the processing based on the operating information on the display unit 52. Further, the processing unit 50 supplies instruction information to the drive control circuit 53 controlling the drive of a motor 201 serving as the drive source of the elevation mechanism 200 (see FIG. 2). The drive control circuit 53 is connected to an encoder 202 detecting the rotational angle position of the motor 201 (corresponding to elevated position) and controls the drive of the motor 201 based on the instruction information from the processing unit 50 and the position information from the encoder 202. By this drive control of the motor 201, the drive of the elevation mechanism 200 is controlled. As a result, the elevation operations of the four cameras 61 to 64 are controlled.

Next, referring to FIG. 4 and FIG. 5, the basic processing performed by this inspection system will be explained.

As shown in FIG. 4, if looking at the two types of wafer cassette 10(A) and 10(B) differing in support portions of the wafers WF and differing in inspected portions, the positions of the inspected portions PLF(A), PLR(A), PRF(A), and PRR (A) of one wafer cassette 10(A) in the field-of-view ranges ELF(A), ELR(A), ERF(A), and ERR(A) of the cameras 61 to 64 differ from the positions of the similar inspected portions PLF(B), PLR(B), PRF(B), and PRR(B) of the other wafer cassette 10(B). For this reason, for example, the projecting part 132k(A) formed on the shelf part 131k(A) supporting the wafer WF included at one inspected portion PLR(A) and the projecting part 132k(B) formed on the shelf part 131k(B) supporting the wafer WF included at the other inspected portion PLR(B) are not expressed on the image under the same conditions. For example, a portion positioned at a back part of the inspection field is expressed relatively small on the image, while conversely a portion positioned at a front side of the inspection field is expressed relatively large on the image.

Therefore, in this inspection system, processing such as shown in FIG. 5A, FIG. 5B, and FIG. 5C is performed.

This processing is generally similar to the image processing called "morphing". As shown in FIG. 5A, a reference mesh 20 of a planar structure comprised of a plurality of vertical lines and horizontal lines arranged perpendicularly intersecting each other in a mesh (reference member) is set near the for example left wafer support part 13L forming an inspected portion of the wafer cassette 10 so as to be parallel to the same. Furthermore, specifically, as shown in FIG. 5B, the reference mesh 20 is set near the front ends of the shelf parts 131k, 131k+1, and 131k+2 as inspected portions of the left wafer support part 13L so that the horizontal lines become parallel to the directions in which the shelf parts 131k to 131k+2 extend. Further, the reference mesh 20 is captured to obtain reference image information. The reference mesh 20 is removed and then that inspected portion (shelf part 131k to 131k+2) is captured to obtain the inspected image information. These image information express three-dimensional-like images where the size becomes smaller the deeper the portion of the wafer cassette 10 since the inspected portion and reference mesh 20 extend to the back part of the wafer cassette 10. Therefore, it performs processing on the inspected image information for obtaining a planar image where the reference mesh 20 substantially faces the front surface (two-dimensional image) from the reference image information and obtains corrected image information showing a planar image such as when viewing the inspected portion such as shown in FIG. 5C from substantially the front surface in the same way (image in state excluding three-dimensional elements) (hereinafter referred to as the "three-dimensional corrected image information"). This three-dimensional corrected image is handled as new image information expressing the inspected portion.

The thus obtained three-dimensional corrected image information can express the inspected portion under standardized conditions of the case of expression by the planar image in the state where the reference mesh 20 arranged substantially in parallel to the inspected portion (left wafer support part 13L) faces the substantially front surface.

The processing unit 50 executes the above-mentioned processing in accordance with the routine of FIG. 6, FIG. 7, and FIG. 10. Note that, the processing according to the routine shown in FIG. 6, FIG. 7, and FIG. 10 is performed on the images captured by the four cameras 61 to 64. Below, the processing on the image captured by the camera 61 will be explained, but the processings on the images captured by the other cameras 62 to 64 are similar.

In FIG. 6, the processing unit 50 instructs the camera 61 to capture the above-mentioned reference mesh 20 (S1). The processing unit 50 receives as input the image signal from the camera 61 and generates the reference image information showing the reference mesh 20 based on that image signal (S2). After that, it calculates a conversion coefficient used for converting from the reference image information to information showing a planar image which is substantially the front surface of the reference mesh 20 (S3) and stores the conversion coefficient in a memory (S4).

Next, the processing unit 50 makes the elevation mechanism 200 rise from the home position. In that process, the processing unit 50 confirms whether the elevation mechanism 200 is normally operating based on the relationship of the information relating to the vertical direction position of the camera 61 from the encoder 201 and the position of the reference pin 311 on the screen based on an image signal representing an image of the reference pin 311 captured by the camera 61. When confirming that the elevation mechanism 200 is operating normally, the processing unit 50 drives the elevation mechanism 200 so that the first inspected portion is included in the field-of-view range ELF of the camera 61 based on the signal from the encoder 201. Further, if the camera 61 reaches a position where the inspected portion is included in that field-of-view range ELF, the processing unit 50 stops the operation of the elevation mechanism 200 and starts the processing in accordance with the routine shown in FIG. 7.

In FIG. 7, the processing unit 50 generates inspected image information showing that inspected portion based on the image signal from the camera 61 capturing the inspected portion (S11). Further, the processing unit 50 processes the inspected image information using a conversion coefficient generated in accordance with the routine shown in FIG. 6 and already stored in the memory and generates three-dimensional corrected image information expressing a planar image such as when viewing the inspected portion from the front surface in the same way as the above-mentioned reference mesh 20. (S12). Further, that three-dimensional corrected image information is stored in a memory (S13).

For example, when the images expressed by inspected image information of inspected portions at a different first type and second type of wafer cassettes are, for example, images I and I' with a feeling of depth such as shown in FIG. 8A and FIG. 9A, the images expressed by the three-dimensional corrected image information become the planar images Ic and Ic' (images excluding three-dimensional elements) such as when viewing the inspected portions from the front surface as shown in FIG. 8B and FIG. 9B. Note that, in FIG. 8A and FIG. 8B and in FIG. 9A and FIG. 9B, the corresponding parts are assigned the same references. In this way, the three-dimensional corrected image information showing the inspected portion of the wafer cassette can express the inspected portion under the standardized conditions of the case of expression by a planar image in the state where the reference mesh 20 arranged substantially in parallel to the inspected portion faces the substantially front surface.

Returning to FIG. 7, the processing unit 50 judges if the three-dimensional corrected image information has been obtained for all inspected portions of the left wafer support part 13L of the wafer cassette 10 to be inspected (S14). Further, when three-dimensional corrected image information is not obtained for all inspected portions (NO at S14), the processing unit 50 operates the elevation mechanism 200 based on the output signal from the encoder 202 until the next inspected portion enters the field-of-view range ELF. Further, when the camera 61 reaches a position where the inspected portion is included in that field-of-view range ELF, the processing unit 50 stops the operation of the elevation mechanism 200 and performs the above-mentioned processing (S11 to S13) again. After this, the above-mentioned processing (S11 to S14) is repeatedly executed until the three-dimensional corrected image information is obtained for all of the inspected portions of the wafer cassette 10. When the three-dimensional corrected image information is obtained for all of the inspected objects (YES at S14), the processing unit 50 ends the series of processing.

Next, the processing unit 50, for example, starts processing in accordance with the routine shown in FIG. 10 based on the instruction information from the input unit 51.

In FIG. 10, the processing unit 50, as explained above, reads out from the memory three-dimensional corrected image information showing the inspected portion stored in the memory (S21). Further, the processing unit 50 generates the appearance attribute information showing an appearance attribute of the inspected portion based on this three-dimensional corrected image information (S22).

This appearance attribute information can be made shape information showing the shapes of the inspected portions such as the shapes of the grooves or pitches of the same, formed by the inspected portions, that is, the shelf parts $131k$, $131k+1$, and $131k+2$ of the wafer support part 13L. In this case, the shape information may express actual shapes of the inspected portions or may express shapes on the image (expressed by three-dimensional corrected image information). When the shape information does not show actual shapes, but shows shapes on the image, it is possible to evaluate shape-like fluctuations of the inspected portions at a plurality of the same type of wafer cassettes based on that shape information.

A histogram showing the relationship between the luminance of the pixels shown by the three-dimensional corrected image information and the number of the same can be generated as the appearance attribute information. In a dark color wafer cassette 10, contamination etc. appears white on the image. From this, this histogram can express the state of contamination as the appearance attribute of the inspected portion. For example, the greater the distribution of pixels with a high luminance, the relatively greater the contamination that can be evaluated.

For example, three regions E1, E2, and E3 are set at an image of an inspected portion expressed by the three-dimensional corrected image information shown in FIG. 11A for a certain type of wafer cassette 10. Histograms at the regions E1, E2, and E3 as shown in FIG. 11B are generated as appearance attribute information. Further, three regions E1, E2, and E3 are set at an image of an inspected portion expressed by the three-dimensional corrected image information shown in FIG. 12A for a different type of wafer cassette. Histograms at the regions E1, E2, and E3 are generated as shown in FIG. 12B.

The profile information obtained by obtaining a moving average of the density values of the pixels which the three-dimensional corrected image information express in a predetermined window size can be generated as appearance attribute information. The profile information expressing the state of density fluctuating by the frequency in accordance with the window size can express the surface roughness as the appearance attribute of the inspected portion. For example, if the surface roughness is uniformly fine, the profile information becomes one with a relatively high stable frequency and low amplitude. On the other hand, for a surface where the roughness becomes partially greater, the profile information becomes one including a part with a partially greater disturbance in frequency and fluctuation in amplitude. It is possible to evaluate the appearance attribute of the inspected portion (roughness) by profile information having such a property.

For example, three regions E1, E2, and E3 are set at an image of an inspected portion expressed by three-dimensional corrected image information shown in FIG. 13A for a certain type of wafer cassette 10. The regions E1, E2, and E3 are image parts corresponding to one shelf part supporting a wafer and inherently have the same appearance attributes. Histograms at the three regions E1, E2, and E3 set in this way are generated as shown in FIG. 13B. In this case, the histograms for the region E1 and region E2 include parts where the numbers of pixels with relatively high luminance spike, so it is possible to evaluate that the inspected portions corresponding to the regions E1 and E2 are contaminated. Further, profile information for the three regions E1, E2, and E3 are generated as shown in FIG. 13C. In this case, the profile information of the regions E1 to E3 become characteristics fluctuating by a stable frequency, so the surface roughness of the inspected portion can be evaluated as being uniform.

Further, three regions E1, E2, and E3 are set at an image of an inspected portion expressed by the three-dimensional corrected image information shown in FIG. 14A for another type of wafer cassette 10. The histograms at the regions E1 to E3 are generated as shown in FIG. 14B. In this case, the histograms become substantially the same for the regions E1, E2, and E3, so the contaminations of the inspected portion corresponding to these regions become the same degree, so the number of pixels with a high luminance also becomes relatively small, so the degree of contamination can be evaluated as also being low. Further, the profile information for the region E1 and region E2 include relatively high frequency components, so it is possible to evaluate the inspected portion corresponding to the region E1 and region E2 as having fine scratches etc.

Returning to FIG. 10, the processing unit 50, as explained above, displays the appearance attribute information (shape information, histograms, and profile information) on the display unit 52 when appearance attribute information is obtained from the three-dimensional corrected image information. The operator can judge the appearance attribute of the inspected portion (shape, state of roughness, state of contamination, etc.) from the appearance attribute information displayed at this display unit 52. Further, the processing unit 50 can compare the appearance attribute information with predetermined reference information and thereby generate information (quality, evaluation value, etc.) showing the evaluation for the appearance attribute of the inspected portion. Further, it is possible to judge the suitability of the appearance attribute of the inspected portion being currently inspected based on that information.

In the above-mentioned embodiment, the three-dimensional corrected image showing the inspected portion of the wafer cassette can express the inspected portion under standardized conditions of a case expressed by a planar image in a state where the reference mesh 20 arranged substantially parallel to the inspected portion faces the substantial front surface, so it is possible to express the inspected portions under the same conditions even by the appearance attribute information obtained based on three-dimensional corrected image information expressing the respective inspected portions of a different type of wafer cassette captured without changing the capturing conditions (histograms, profile information, etc. (see FIG. 11A, FIG. 11B, FIG. 12A, and FIG. 12B, further, see FIG. 13A, FIG. 13B, FIG. 13C, FIG. 14A, FIG. 14B, and FIG. 14C)). Therefore, by using that appearance attribute information, it is possible to judge, that is, inspect, the appearance attributes of the respective inspected portions for different types of wafer cassettes by a common reference.

Note that, in the above-mentioned example, the wafer support parts 13L and 13R inside the wafer cassette 10 were made the inspected portions, but a similar wafer support part is formed at the inside of the lid fit over the front open part of the wafer cassette 10. Therefore, instead of the wafer cassette 10, if setting that lid on the table 300 so that the wafer support part for example enters the field-of-view ranges ELF and FIR of the cameras 61 and 62, it is also possible to use a routine similar to the above to inspect the appearance attributes of the lid.

Further, in the above-mentioned example, a color image was not particularly processed, but the cameras 61 to 64 can process color images by providing them with color light receiving elements. In this case, it becomes possible to inspect the appearance attributes of the inspected portion in accordance with a similar processing routine for any color of wafer cassette.

The reference mesh 20 may be captured in the state actually held in the wafer cassette 10 or in the state set alone at a position matching a predetermined relative positional relationship to the wafer cassette 10.

Furthermore, it is possible to judge the quality of an inspected portion in a wafer cassette 10 in the following way. In this technique of quality judgment, rectangular inspection regions EG divided into pluralities of rectangular windows (for example, 1 to 12) are set for the three-dimensional corrected images $I_{type1}$ and $I_{type2}$ corresponding to the shelf parts of the wafer cassette 10 being inspected as shown in FIG. 15A or FIG. 15B. Further, the quality of the appearance of the inspected portion (shelf part) is judged based on the histograms of the luminance values (density values) for the rectangular windows of the rectangular inspection region EG.

Specifically, processing is performed in accordance with the routine shown in FIG. 16 and FIG. 17. Note that, this processing is executed by the processing unit 50 shown in FIG. 3.

First, a good wafer cassette is selected as the reference wafer cassette, the inspected portions (support parts 13L and 13R) of the reference wafer cassette are captured N number of times, and N numbers of three-dimensional corrected image information are obtained as the reference (good) three-dimensional corrected image information Ii (I=1 to N) in accordance with the routine shown in FIG. 7. The N numbers of reference three-dimensional corrected image information Ii for the reference wafer cassette are stored in a predetermined memory. Note that it is also possible to capture the same type of N wafer cassettes once each to obtain N numbers of three-dimensional corrected image information Ii.

In this state, the processing unit 50 reads out one reference three-dimensional corrected image information Ii (S1) and sets a rectangular inspection region EG on a reference three-dimensional corrected image Ii (corresponding to $I_{type1}$ or $I_{type2}$) expressed by the reference three-dimensional corrected image information Ii as shown in FIG. 15A or FIG. 15B (S2). This rectangular inspection region EG is divided into a plurality of rectangular windows (in this example, 12 rectangular windows, below, simply referred to as "windows").

The processing unit 50 prepares histograms his(j) showing the states of distribution of the luminance values (density values) in the respective windows (j) of the rectangular inspection region EG set on the reference three-dimensional corrected image Ii (S3). Due to this, for example, as shown in the histograms his(3) and his(12) for the windows (3) and (12) shown in FIG. 18 and FIG. 19, histograms his(j) showing the states of distribution of the luminance values (density values) for the respective windows (j) (j=1 to 12) are obtained. The processing unit 50, as explained above, prepares histograms his(j) for the respective windows (j) of the rectangular inspection region EG in accordance with similar processing (S1 to S3) for all of the N reference three-dimensional corrected images Ii obtained for the same reference wafer cassette.

Further, if the processing ends for all of the N reference three-dimensional corrected images Ii (YES at S4), the processing unit 50 averages the N histograms obtained for each window (j) in accordance with $$1/N \cdot \sum_{i=0}^{N} his(j) = his_{AVE}(j) \quad \text{[Equation 1]}$$

to prepare the reference histogram $his_{AVE}(j)$ for each window (j) (S5). Further, the processing unit 50 calculates the standard deviation value (showing the state of distribution of the luminance values) of the obtained reference histogram $his_{AVE}(j)$ of each window (j) as the reference standard deviation value $\sigma_{REF}(j)$ (S6).

Further, the processing unit 50 calculates a weighting coefficient Wj in accordance with the degrees of fluctuation of the N histograms obtained for each windows (j) (state of distribution of N histograms) (S7). The weighting coefficient Wj become smaller in value the larger the degrees of fluctuation of the N histograms of the window and become larger in value the smaller the degrees of fluctuation of the N histograms of the window. Further, the weighting coefficient Wm for the window (m) with the smallest degree of fluctuation of the N histograms is designated as "1" and the degree of fluctuation of the N histograms obtained for that window (m) is designated as the reference. The reciprocal of the ratio of the degree of fluctuation of the N histograms obtained for another window (k) to the reference can be set as the value of the weighting coefficient Wk for the other window (k).

Note that, the degrees of fluctuation of the N histograms obtained for each window (j) can, for example, be obtained based on the range of fluctuation of the luminance value for all N histograms and the range of fluctuation of the center luminance value or by another known statistical method.

The inspection processing (quality judgment processing) for an actual wafer cassette is performed in accordance with the routine shown in FIG. 17.

The inspected portions of the wafer cassette to be inspected (support parts 13L and 13R) are captured and three-dimensional corrected image information I of those inspected portions are obtained in accordance with the routine shown in FIG. 7 and stored in a predetermined memory.

In this state, the processing unit 50 reads out the three-dimensional corrected image information I corresponding to the wafer cassette to be inspected (S11) and the above-mentioned rectangular inspection region EG (see FIG. 15A and FIG. 15B) is set on the three-dimensional corrected image I expressed by that three-dimensional corrected image information I (S12). The processing unit 50 prepares a histogram his(j) expressing the state of distribution of the luminance values (density values) in the respective windows (j) of the rectangular inspection region EG set on that three-dimensional corrected image I (S13). Due to this, in the above-mentioned way, for example, histograms his(j) for the windows (j) such as the histograms his(3) and his(12) for the windows (3) and (12) shown in FIG. 18 and FIG. 19 are obtained. Further, the processing unit 50 calculates the standard deviation value of the obtained histogram his(j) as the inspection standard deviation value $\sigma_{INS}(j)$ (S14).

Next, the processing unit 50 uses the reference standard deviation value $\sigma_{REF}(j)$ and inspection standard deviation value $\sigma_{INS}(j)$ and calculates the degree of match in accordance with the degree of match=$\sigma_{INS}(j)/\sigma_{REF}(j)$ for the windows (j) (S15). This degree of match expresses the degree of match between the state of distribution of luminance values at a three-dimensional corrected image corresponding to the reference wafer cassette and the state of distribution of luminance values at a three-dimensional corrected image corresponding to the wafer cassette to be inspected. If they match, the value becomes "1". The smaller the degree of match (the greater the degree of difference), the more different that value from 1. The state of the surface of the inspected portion (state of scratches, dust, film, etc.) is reflected in the luminance distribution (density distribution) of the captured image (three-dimensional corrected image), so it is possible to express the degree by which the states of the surfaces of the inspected portions (support parts 13L, 13R) of the wafer cassette to be inspected match the state of the surface of the same inspected portion of the reference wafer cassette based on the degree of match.

When the degrees of match for respective the windows (j) have been obtained as explained above, the processing unit 50 uses the degree of match and weighting coefficient Wj obtained for each corresponding window (j) to judge if the value of

|1−degree of match|·Wj is smaller than a predetermined threshold value α (S16).

In the above formula, the value of the |1−degree of match| shows the degree by which the state of the surface of an inspected portion (support parts 13L and 13R) of the wafer cassette to be inspected does not match the state of the surface of the same inspected portion of the reference wafer cassette. If that value is smaller than a certain threshold value α (when Wj=1), the difference between the state of the surface of the part of the window (j) of the inspected portion and the state of the surface of the same part of the reference wafer cassette is small and it can be judged that the state of the surface part corresponding to the window (j) is normal.

On the other hand, when the value of the |1−degree of match| is the threshold value α or more (case where Wj=1), the difference between the state of the surface of the part of the window (j) of the inspected portion and the state of the surface of the same part of the reference wafer cassette is large and it can be judged that the state of the surface part corresponding to the window (j) is not normal.

Furthermore, in the present embodiment, the value of the |1−degree of match| multiplied with the weighting coefficient Wj is compared with the threshold value α. This weighting coefficient Wj, as explained above, expresses the degree of fluctuation of the N reference histograms obtained for each window (j) from the N reference three-dimensional corrected images. Further, the larger that fluctuation, the smaller the value. Therefore, for a window (j) where the N reference histogram s (reference standard deviation value) which is the reference of the degree of match greatly fluctuates (small value of Wj is set), this weighting coefficient Wj acts to ease that judgment reference (threshold value α).

Accordingly, the processing unit 50 judges that the window (j=12, 3) passes (OK) when the value of the

|1−degree of match|·Wj is smaller than a predetermined threshold value α such as in the case of the window (12) shown in FIG. 18 or the window (3) shown in FIG. 19 (S17) and judges that the window (j) is defective (NG) when the value is the threshold value α or more such as in the case of the window (3) shown in FIG. 18 or the window (12) shown in FIG. 19 (S18). Further, for example, if a defect is judged for even one window among the plurality of windows (j) forming the set rectangular inspection region EG, it is possible to judge that the wafer cassette (inspected portion) is defective. Note that the reference of the quality judgment for this wafer cassette (inspected portion) may be suitably determined.

According to the quality judgment processing of the inspected portion as explained above, the weighting coefficient Wj expressing the degree of fluctuation of a plurality of reference histograms obtained for each window (j) of the rectangular inspection region EG set for the reference wafer cassette is used for the quality judgment of the inspected portion, so even if the degrees of fluctuation of the state of distribution of the pixel values for each window (j) differ, it is possible to perform the quality judgment of the inspected portion by a standard threshold value α without changing the reference for each window.

Note that in the above-mentioned quality judgment processing, it is possible to change the threshold value α used as a reference in quality judgment for each window of a rectangular inspection region EG. Further, the inspection regions and windows were made rectangular, but either may also be made another shape such as a triangular shape or circular shape as well.

INDUSTRIAL APPLICABILITY

The wafer cassette inspection method and system according to the present invention has the effect of enabling the shapes and other appearance attributes of inspected portions of different types of wafer cassettes under the same conditions without changing the capturing conditions for each type of wafer cassette and useful as a wafer cassette inspection system for inspecting the internal appearance of a wafer cassette holding semiconductor wafers in an aligned manner.

The invention claimed is:

1. A wafer cassette inspection system having
   an imaging device set facing a front open surface of a wafer cassette set on a table so that a field-of-view range includes an inspected portion of the inside of the wafer cassette, capturing said field-of-view range, and outputting an image signal and
   a processing unit processing an image signal from said imaging device,
   said processing unit having
   a reference image generating means for generating reference image information based on an image signal output by said imaging device capturing a reference member having a predetermined shape and set with a predetermined layout relationship to said inspected portion in said field-of-view range,
   an inspected image information generating means for generating inspected image information based on an image signal output by said imaging device capturing an inspected portion inside the wafer cassette,
   an image correcting means for applying processing for obtaining a predetermined planar image of said reference member from said reference image information to said inspected image information to generate corrected image information, and
   a means for generating the appearance attribute information showing an appearance attribute of said inspected portion based on said corrected image information.

2. A wafer cassette inspection system as set forth in claim 1, further having a quality judging means for judging the quality of the inspected portion based on said appearance attribute information.

3. A wafer cassette inspection system as set forth in claim 2, wherein the system further has a reference information generating means for generating appearance attribute information for an inspected portion of a predetermined wafer cassette serving as a reference as the appearance attribute reference information, and said quality judging means judges the quality of the inspected portion in the wafer cassette to be inspected based on said appearance attribute information for the inspected portion of the wafer cassette to be inspected and said appearance attribute reference information.

4. A wafer cassette inspection system as set forth in claim 1, wherein said reference member is a planar structure having a plurality of vertical lines and horizontal lines arranged perpendicularly intersecting each other in a mesh.

5. A wafer cassette inspection system as set forth in claim 1, wherein said appearance attribute information generating means sets a plurality of regions on a corrected image expressed by said corrected image information and generates appearance attribute information based on states of distribution of pixel values in those regions.

6. A wafer cassette inspection system as set forth in claim 5, wherein said plurality of regions set on the corrected image are a plurality of rectangular windows obtained by dividing a rectangular region.

7. A wafer cassette inspection system as set forth in claim 1, wherein said inspected portion is a semiconductor wafer support part formed at a side wall in said wafer cassette and having a plurality of shelf parts.

8. A wafer cassette inspection system as set forth in claim 7, wherein
   said reference member is a planar structure having a plurality of vertical lines and horizontal lines arranged perpendicularly intersecting each other in a mesh and
   said reference image generating means generates said reference image information based on an image signal output from said imaging device when said imaging device captures said reference member where a plane in which the plurality of vertical lines and horizontal lines are arranged is set at a predetermined nearby position of a support part of said semiconductor wafer in a layout parallel to the same.

9. A wafer cassette inspection system as set forth in claim 7, wherein said appearance attribute information generating means sets a rectangular region divided into a plurality of rectangular windows on a corrected image expressed by said corrected image information and generates said appearance attribute information based on the state of distribution of pixel values in each rectangular window.

10. A wafer cassette inspection system as set forth in claim 9, further provided with
a reference information generating means for generating appearance attribute reference information based on the state of distribution of pixel values for each rectangular window of said rectangular region set on a corrected image for a semiconductor wafer support part of a predetermined wafer cassette serving as a reference and
a quality judging means for judging the quality of the inspected portion of the wafer cassette to be inspected based on said appearance attribute reference information for each rectangular window and appearance attribute information for the corresponding rectangular window generated by said appearance attribute information generating means for the wafer cassette to be inspected.

11. A wafer cassette inspection system as set forth in claim 10, wherein said reference information generating means generates a histogram showing the state of distribution of pixel values for each rectangular window of said rectangular region for each of the plurality of corrected images generated for a predetermined wafer cassette serving as a reference and generates appearance attribute reference information based on the plurality of histograms for said plurality of corrected images for each rectangular window.

12. A wafer cassette inspection system as set forth in claim 11, wherein
said system further has a weight generating means for generating a weighting coefficient in accordance with degrees of fluctuation of a plurality of histograms obtained for each rectangular window of said rectangular region set for the predetermined wafer cassette serving as the reference, and
said quality judging means judges the quality of the inspected portion of the wafer cassette to be inspected based on said appearance attribute reference information and said appearance attribute information for each rectangular window and the weighting coefficient for the corresponding rectangular window.

13. A wafer cassette inspection method using
an imaging device set facing a front open surface of a wafer cassette set on a table so that a field-of-view range includes an inspected portion of the inside of the wafer cassette, capturing said field-of-view range, and outputting an image signal and having
a reference image generating step generating reference image information based on an image signal output from said imaging device when said imaging device captures a reference member having a predetermined shape and set with a predetermined layout relationship to said inspected portion in said field-of-view range,
an inspected image information generating step generating inspected image information based on the image signal which said imaging device outputs by capturing said inspected portion inside the wafer cassette,
an image correction step applying processing for obtaining a predetermined planar image of said reference member from said reference image information to said inspected image information to generate corrected image information, and
a step of generating appearance attribute information showing an appearance attribute of said inspected portion based on said corrected image information.

* * * * *